United States Patent
Namari et al.

(10) Patent No.: US 6,901,919 B2
(45) Date of Patent: Jun. 7, 2005

(54) SYSTEM FOR CONTROLLING FLOW OF INTAKE AIR DURING START-UP PERIOD OF ENGINE

(75) Inventors: Takashi Namari, Tochigi (JP); Masato Ono, Tochigi (JP); Satoshi Chida, Tochigi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/454,635

(22) Filed: Jun. 5, 2003

(65) Prior Publication Data

US 2004/0020478 A1 Feb. 5, 2004

(30) Foreign Application Priority Data

Jul. 30, 2002 (JP) ........................................ 2002-221020

(51) Int. Cl.[7] .............................................. F02M 23/00
(52) U.S. Cl. ...................................... 123/588; 123/339
(58) Field of Search ................................ 123/588, 339, 123/339.23

(56) References Cited

U.S. PATENT DOCUMENTS

| 4,231,337 A |   | 11/1980 | Kuwahara et al. |
| 4,393,012 A | * | 7/1983 | Kato et al. ................. 261/39.2 |
| 4,567,476 A | * | 1/1986 | Lang ...................... 340/636.15 |
| 4,787,351 A |   | 11/1988 | Sakamoto et al. |
| 5,065,718 A |   | 11/1991 | Suzuki et al. |
| 6,315,693 B1 | * | 11/2001 | Tayama ........................ 477/46 |

FOREIGN PATENT DOCUMENTS

| EP | 0 900 683 | 3/1999 |
| EP | 1 041 266 | 10/2000 |
| JP | 02081940 A | * 3/1990 ........... F02D/41/16 |

OTHER PUBLICATIONS

Patent Abstracts of Japan, vol. 009, No. 103 (M–377), JP 59 226258, Dec. 1984.

* cited by examiner

Primary Examiner—Thomas Denion
Assistant Examiner—Zelalem Eshete
(74) Attorney, Agent, or Firm—Westerman, Hattori, Daniels & Adrian, LLP (57) ABSTRACT

A system for controlling a flow of intake air in a secondary intake air passage during a start-up period of an internal combustion engine. A main intake air passage extends to an intake port of the engine. A throttle valve is located in the main intake air passage. The secondary intake air passage connects to the main intake air passage at a position downstream of the throttle valve. The system includes a heater to heat a thermo-sensitive valve provided in the secondary intake air passage. A valve opening degree of the thermo-sensitive valve changes as the valve is heated by the heater. The system determines a duty ratio that controls a drive current supplied to the heater. The system supplies the drive current to the heater by applying a voltage pulse at a predetermined period. The voltage pulse has a pulse width determined by the duty ratio.

18 Claims, 6 Drawing Sheets

SYSTEM FOR CONTROLLING FLOW OF INTAKE AIR DURING START-UP PERIOD OF ENGINE

BACKGROUND OF THE INVENTION

1. Field of the Invention

The present invention generally relates to a system for controlling an intake air to be supplied to an internal combustion engine, and more particularly to a system for adjusting an amount of air to be introduced to a secondary intake air passage that connects to a main intake air passage at a position downstream of a throttle valve when the engine is operating in a start-up condition.

2. Description of the Related Art

Some types of engines have a main intake air passage and a secondary intake air passage. Usage of the main and secondary intake air passages is controlled by an air flow control unit. The secondary intake air passage connects to the main intake air passage such that the secondary intake air passage bypasses a throttle valve provided in the main intake air passage. The secondary intake air passage is therefore a bypass passage. During a start-up operation of the engine, the air flow control unit causes the intake air to flow in the secondary intake air passage only, and this intake air is only supplied to the engine. The air flow control unit includes a thermo-sensitive valve located in the secondary intake air passage. The thermo-sensitive valve is heated by a PTC (positive temperature coefficient) heater. The thermo-sensitive valve has wax therein. During a cold start-up of the engine, the wax is in a solid state so that the thermo-sensitive valve is in an open condition. As the PTC heater heats the thermo-sensitive valve (more precisely, the wax) and the temperature of the wax rises, the wax melts and the thermo-sensitive valve gradually (or correspondingly) closes. With this temperature-dependent movement of the thermo-sensitive valve, the intake air flowing in the bypass passage is gradually reduced during the warm-up period of the engine. Accordingly, the engine revolution speed is controlled to an appropriate idling speed during the start-up.

Figure 1:
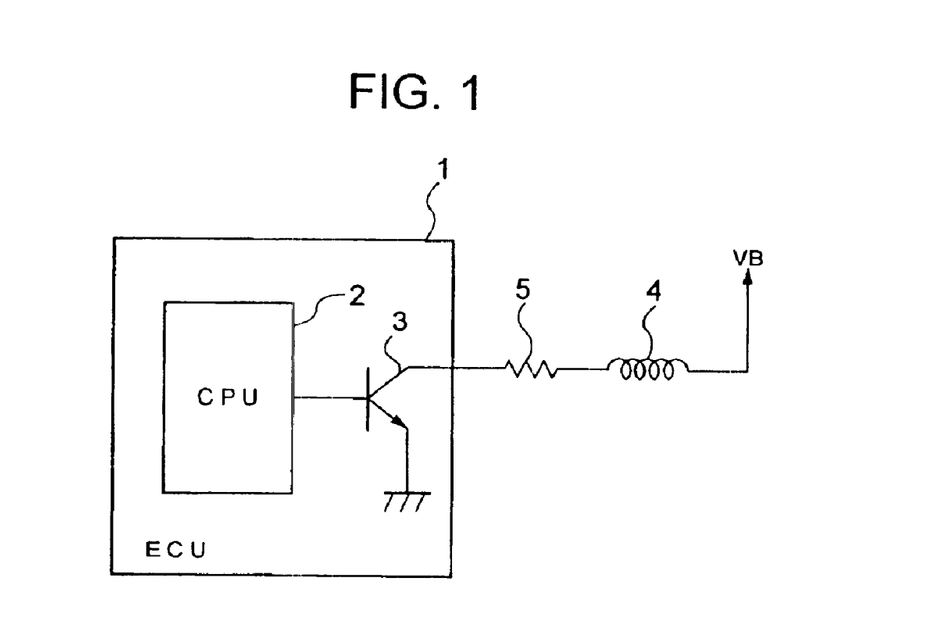
FIG. 1 schematically illustrates a block diagram of a a start-up of an engine.

The PTC heater is a ceramic element having a positive temperature-electric resistance characteristic. The PTC heater presents a low resistance at a low temperature, and a high resistance at a high temperature. Referring to FIG. 1 of the accompanying drawings, the air flow control unit will be described briefly. A CPU (central processing unit) 2 and a drive transistor 3 are provided in an ECU (engine control unit) 1, and the PTC heater 4 and the resistance 5 are provided externally of the ECU 1. The PTC heater 4 and resistance 5 creates a DC circuit. When the CPU 2 detects the start of the engine from, for example, the engine revolution speed, the CPU 2 turns the drive transistor 3 on. Upon turning on of the drive transistor 3, a power source voltage VB is applied to the DC circuit of the PTC heater 4 and resistance 5. As a result, a current flows through the PTC heater 4 and resistance 5, and the PTC heater 4 radiates heat. The resistance 5 is provided for adjusting the current flowing through the PTC heater 4. If the resistance value of the resistance 5 is high, the temperature increase of the PTC heater 4 becomes gentle and the opening/closing movement of the thermo-sensitive valve becomes gentle. The resistance value of the resistance 5 is decided by a manufacturer of the air flow control unit such that an opening/closing movement designed by the manufacturer is realized. Thus, the resistance value of the resistance 5 is fixed when the air flow control unit is manufactured.

The ECU 1 is manufactured separately from the thermo-sensitive valve. Therefore, in order to decide the opening/closing movement characteristic of the thermo-sensitive valve, the resistance 5 should be provided outside the ECU 1. Further, if the resistance value of the resistance 5 is fixed, the opening/closing movement characteristic of the thermo-sensitive valve is also fixed. Changing the opening/closing movement characteristic of the thermo-sensitive valve is therefore troublesome.

SUMMARY OF THE INVENTION

An object of the present invention to provide an improved system for controlling an intake air flow during a start-up of an engine, which can easily adjust an opening/closing movement characteristic of a thermo-sensitive valve.

In accordance with one aspect of the present invention, there is provided an improved system for controlling a flow of intake air in a secondary intake air passage during a start-up period of an internal combustion engine. A main intake air passage extends to an intake port of the internal combustion engine. A throttle valve is located in the main intake air passage. The secondary intake air passage connects to the main intake air passage at a position downstream of the throttle valve. The system includes a heat radiating element for radiating heat in response to a drive current supplied to the heat radiating element. The system also includes a thermo-sensitive valve provided in the secondary intake air passage. A valve opening degree of the thermo-sensitive valve changes as the thermo-sensitive valve is heated by the heat radiating element. The system further includes determination means for determining a duty ratio that controls the drive current. The system also includes a drive unit for supplying the drive current to the heat radiating element by applying a voltage pulse at a predetermined period. The voltage pulse has a pulse width decided by the duty ratio.

The determination means determines the duty ratio from, for example, one or more engine operating conditions. Thus, the duty ratio is adjusted appropriately and the opening/closing movement characteristic of the thermo-sensitive valve can be adjusted appropriately.

Other objects, aspects and advantages of the present invention will become apparent to those skilled in the art when the following detailed description and the appended claims are read and understood in conjunction with the accompanying drawings.

DETAILED DESCRIPTION OF THE INVENTION

An embodiment of the present invention will be described with reference to FIGS. 2 to 8.

Figure 2:
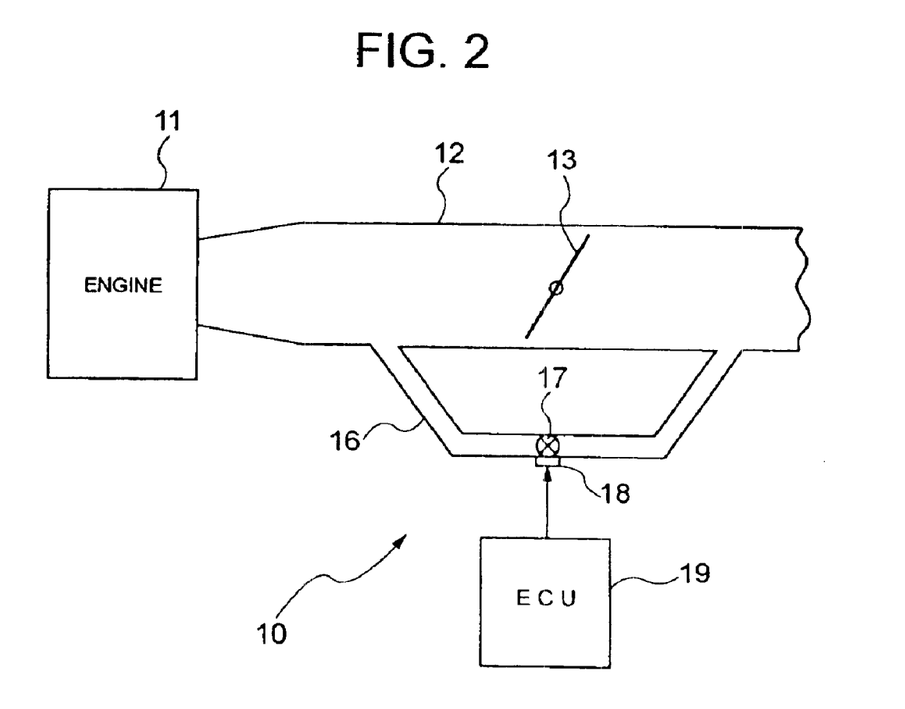
FIG. 2 illustrates an internal combustion engine equipped with a system for controlling a flow of intake air during a start-up of an engine according to one embodiment of the present invention.

Referring first to FIG. 2, a system 10 for controlling an intake air flow during a start-up of an engine according to the embodiment of the invention is illustrated. A throttle valve 13 is provided in an intake air passage 12. The intake air passage 12 connects to an intake port of an internal combustion engine 11. The intake air passage 12 is a main intake air line to supply combustion engine 11. The intake air passage 12 is a main intake air line to supply the main intake air to the engine 11.

It should be noted that the engine 11 has at least one cylinder with at least one intake port and at least one intake air passage 12 and each cylinder has at least one spark plug, although only one intake air passage 12 is illustrated in FIG. 2 and the following description deals with the illustrated intake air passage 12 only.

The main intake air line 12 has a bypass passage (secondary air passage) 16 that bypasses the throttle valve 13 to supply a secondary intake air to the engine 11. A thermo-sensitive valve 17 is provided in the bypass line 16. The thermo-sensitive valve 17 is associated with a PTC heater 18. Wax (or a wax-type element) inside the valve 17 is solid when the temperature of the wax is low. When the wax is solid in the valve 17, the valve 17 is in an open condition. For example, the wax is solid during the cold start-up of the engine. As the PTC heater 18 heats the valve 17 (the wax therein) and the temperature of the valve (or the wax) rises, the wax melts gradually and the valve 17 correspondingly closes.

Figure 3:
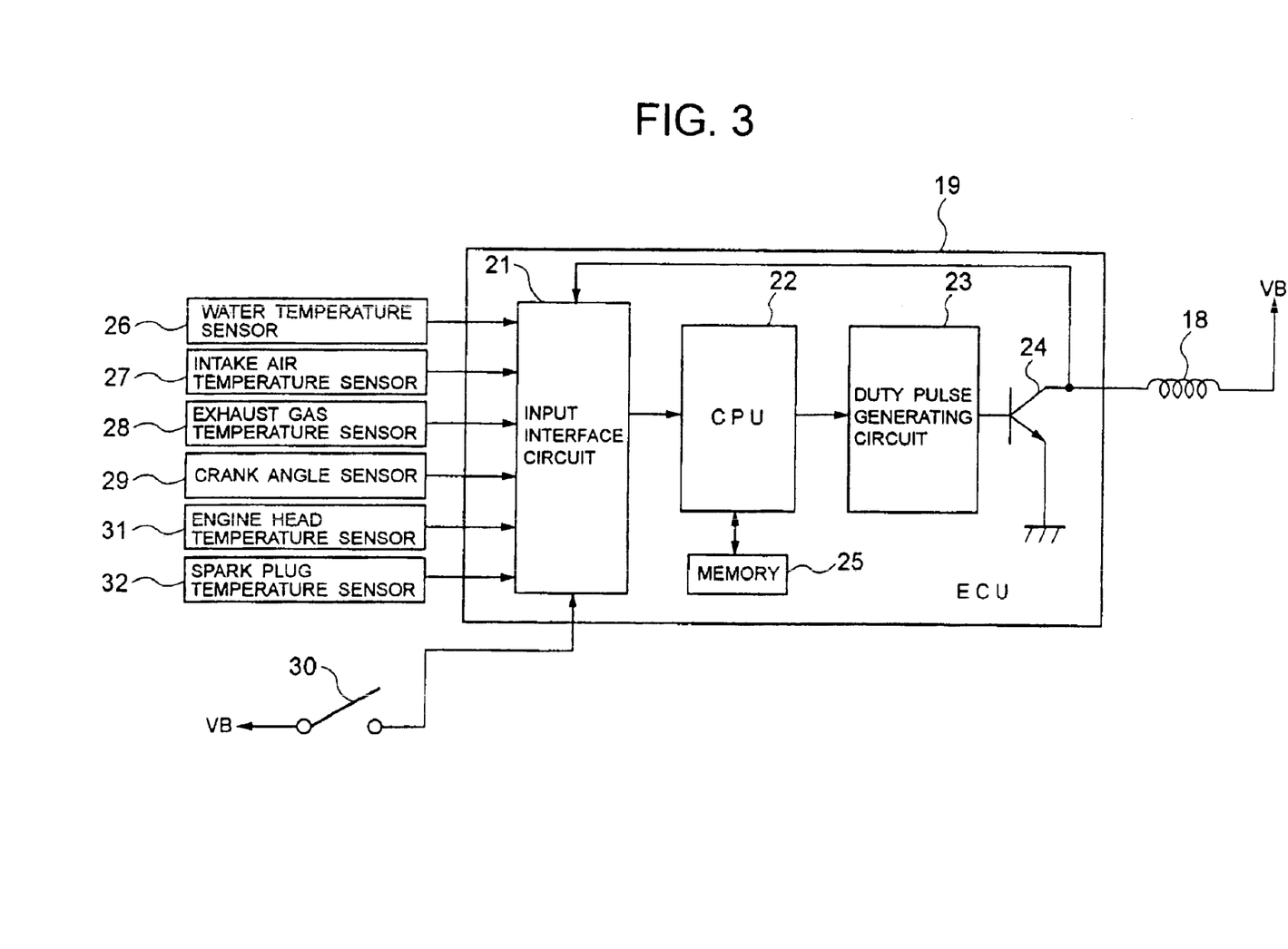
FIG. 3 illustrates a block diagram of an engine control unit (ECU) used in the system shown in FIG. 2.

The PTC heater 18 is connected to an ECU 19. Referring to FIG. 3, the ECU 19 includes an input interface circuit 21, a CPU 22, a duty pulse generating circuit 23, a drive transistor 24, and a memory 25.

The input interface circuit 21 is connected to a water temperature sensor 26 to detect an engine cooling water temperature, an intake air temperature sensor 27 to detect an intake air temperature, an exhaust gas temperature sensor 28 to detect an exhaust gas temperature, a crank angle sensor 29 to detect an engine revolution speed (rpm), an engine head temperature sensor 31 to detect an engine head temperature, and a spark plug temperature sensor 32 to detect a spark plug temperature. A spark plug is not illustrated in the drawings. These sensors are examples of means for determining engine running condition parameters. The input interface circuit 21 is also connected to an ignition switch 30 so that turning on of the ignition switch 30 (i.e., the start of the engine) is detected. The input interface circuit 21 receives detection results from the sensors 25 to 29, 31 and 32 and a turning on/off signal from the ignition switch 30, and supplies the corresponding information to the CPU 22.

The CPU 22 controls the PTC heater 12 by means of p duty ratio. In other words, the CPU 22 controls a duty ratio of the driving of the PTC heater 18, based on the information provided from the input interface circuit 21. The CPU 22 performs a duty ratio determination process (will be described later), and supplies duty ratio data to the duty pulse generating circuit 23. The duty pulse generating circuit 23 repeatedly generates a duty ratio pulse at a certain period T1, based on the duty ratio data supplied from the CPU 22. The duty ratio pulse is a pulse of the duty ratio carried (represented) by the duty ratio data. The duty ratio pulse is supplied to the drive transistor 24. The duty pulse generating circuit 23 includes, for example, a 100-scale/notation counter (not shown) and a comparator (not shown). The counter counts clocks for every interval T1. The comparator generates a duty ratio pulse when the count of the counter reaches the duty ratio of the duty ratio data. It should be noted that the configuration of the duty pulse generating circuit 23 is not limited to the above described one. Any suitable configuration may be employed by the duty pulse generating circuit 23.

The drive transistor 24 is an NPN transistor, which is turned on in response to the duty ratio pulse to activate (energize) the PTC heater 18. The base of the drive transistor 24 is connected to a port of the CPU 22, the emitter is grounded, and the collector is connected to one end of the PTC heater 18. The power source voltage VB is applied to the other end of the PTC heater 18. Therefore, when the drive transistor 24 is turned on, the power source voltage VB is supplied to the PTC heater 18 via the collector-emitter of the drive transistor 24.

The collector of the drive transistor 24 is also connected to the input interface circuit 21. The CPU 22 can monitor the collector voltage of the drive transistor 24 via the input interface circuit 21.

The memory 25 is connected to the CPU 22. The memory 25 stores programs and data needed for the operation of the CPU 22.

In the air flow control system 10, the CPU 22 performs the duty ratio determination process immediately after the start of the engine.

Figure 4:
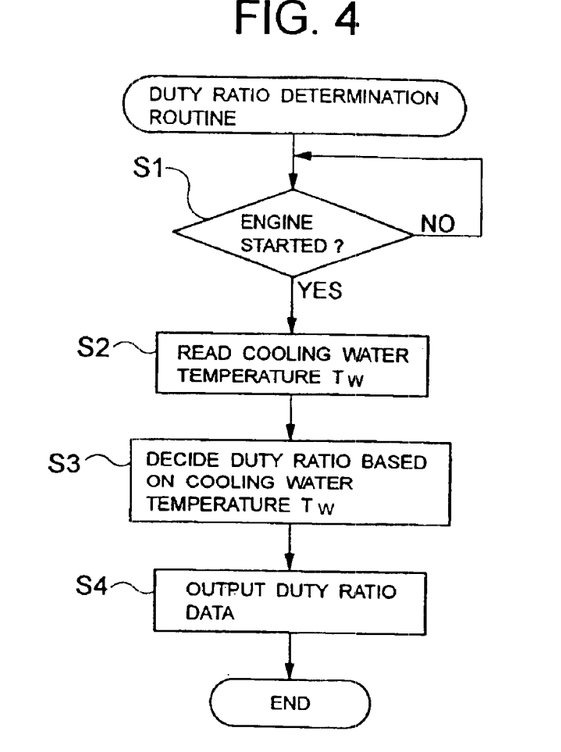
FIG. 4 illustrates a flowchart of a duty ration determination routine.

Referring to FIG. 4, the duty ratio determination process is described. The CPU 22 first determines whether the engine 11 is started (Step S1). Starting of the engine 11 is determined by, for example, the turning on of the ignition switch 30 and the increasing of the engine revolution speed (rpm) to a predetermined value. When the CPU 22 determines that the engine 11 is started, the CPU 22 reads the cooling water temperature Tw from the water temperature sensor 26 via the input interface circuit 21 (Step S2) and sets a duty ratio based on the cooling water temperature Tw (Step S3). A table of the duty ratio-cooling water temperature Tw is stored in the memory 25 so that the CPU 22 can determine the duty ratio from the cooling water temperature Tw by referring to the table. After determining the duty ratio, the CPU 22 outputs the duty ratio data to the duty pulse generating circuit 23 (Step S4). End of the Step S4 is the completion of the duty ratio determination process. After that, the CPU 22 does not return to Step S1 as long as the engine 11 is operating.

The duty pulse generating circuit 23 produces the duty pulse at the predetermined period T1 based on the duty ratio data. The duty pulse turns on the drive transistor 24. In each period T1, the drive transistor 24 is kept in the on condition during the time corresponding to the pulse width of the duty pulse. While the drive transistor 24 is being turned on, the power source voltage VB is applied to the PTC heater 18 and the drive current flows in the PTC heater 18. Since the duty pulse is generated at the predetermined period T1 and the power source voltage VB is repeatedly supplied to the PTC heater 18, the drive current corresponding to the duty ratio determined at Step S3 by the CPU 22 flows in the PTC heater 18 in a consistent manner.

Figure 5:
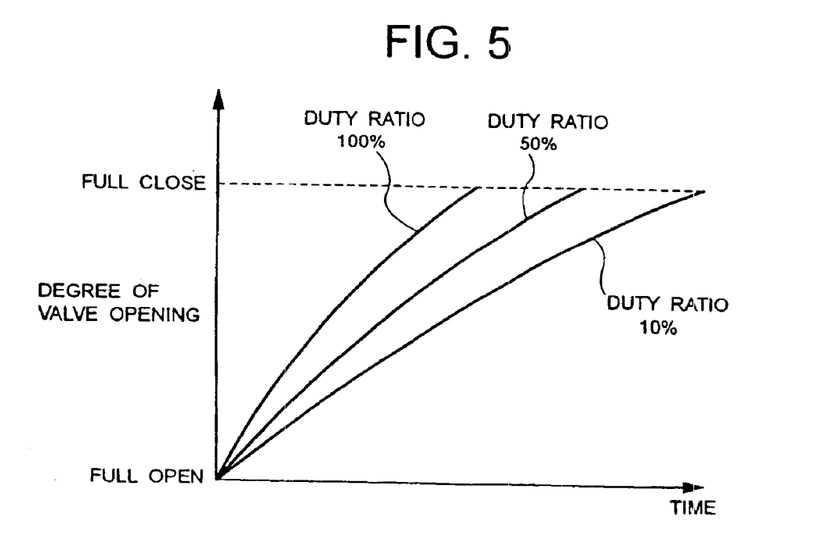
FIG. 5 illustrates relationship between a duty ratio and an opening degree of a thermo-sensitive valve.

In general, the cooling water temperature Tw immediately after the start up of the engine is not a constant value; it can take various values, depending upon, for instance, the engine operating condition in the last several hours and the environmental conditions. The duty ratio therefore takes a value which is variable with the cooling water temperature Tw immediately after the start up of the engine, and the temperature increase of the PTC heater 18 is variable. The temperature increase of the PTC heater 18 becomes faster as the duty ratio becomes larger. As shown in FIG. 5, therefore, when the duty ratio is large, the valve closing speed of the thermo-sensitive valve 17 is fast.

In the above described embodiment, the duty ratio is determined by only the cooling water temperature Tw immediately after the engine start-up. It should be noted, however, that the present invention is not limited in this regard. For instance, the duty ratio may be decided in accordance with the changing cooling water temperature Tw during the engine warm-up period. This modification will be described with reference to FIG. 6.

Figure 6:
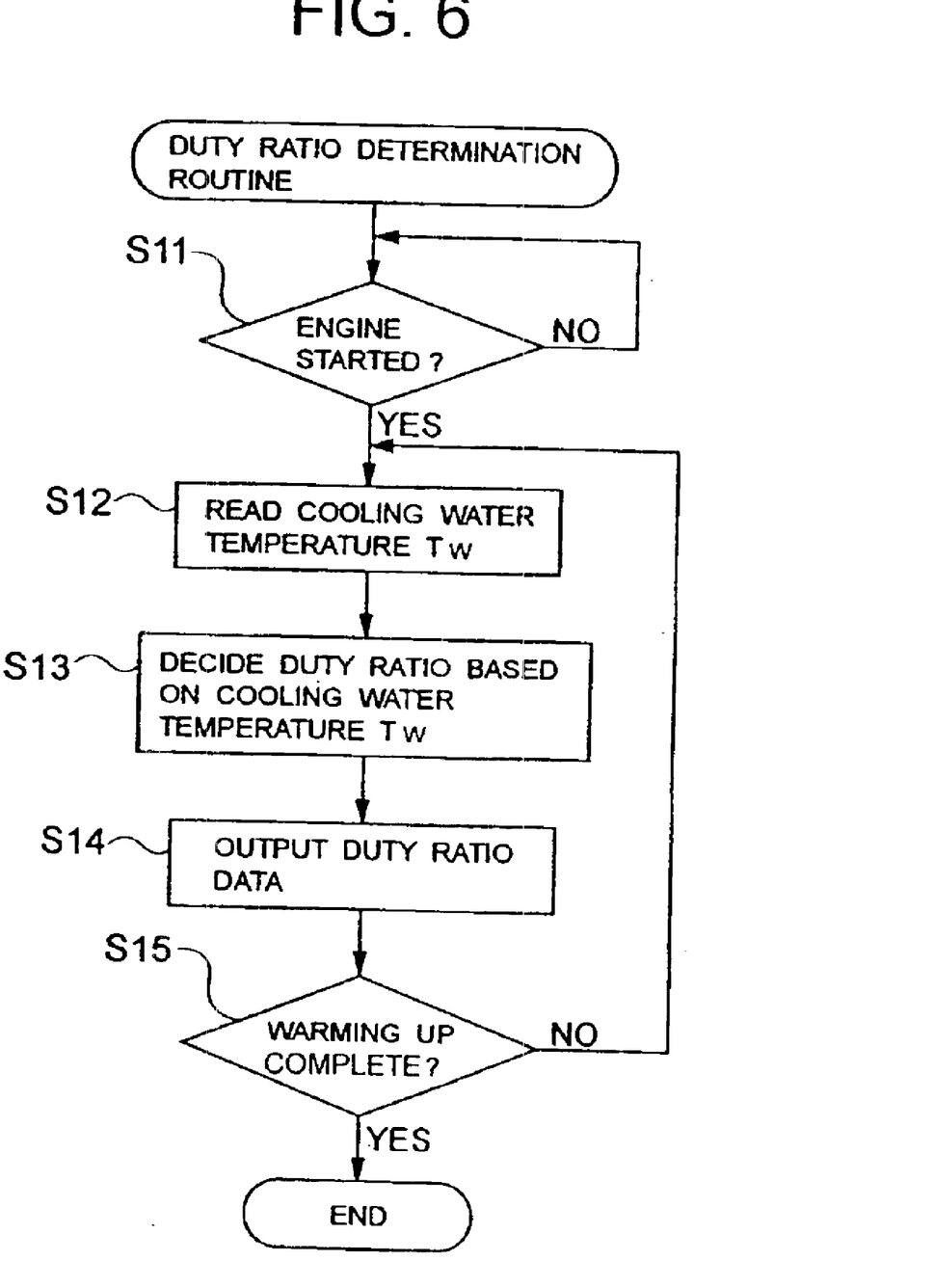
FIG. 6 illustrates a flowchart of a duty ration determination routine according to a modified embodiment of the present invention.

FIG. 6 illustrates the duty ratio setting process in accordance with the change of the cooling water temperature Tw during the warm-up period of the engine. The CPU 22 repeatedly performs the duty ratio determination process of FIG. 6 at, for example, the period T1. It should be noted, however, that the CPU 22 may repeat the process of FIG. 6 at a period shorter the period T1.

In the duty ratio determination process, the CPU 22 determines whether the engine 11 is started (Step S11). When the starting of the engine 11 is detected, the CPU 22 reads the cooling water temperature Tw from the water temperature sensor 26 via the input interface circuit 21 (Step S12) and sets a duty ratio based on the cooling water temperature Tw (Step S13).

Figure 7:
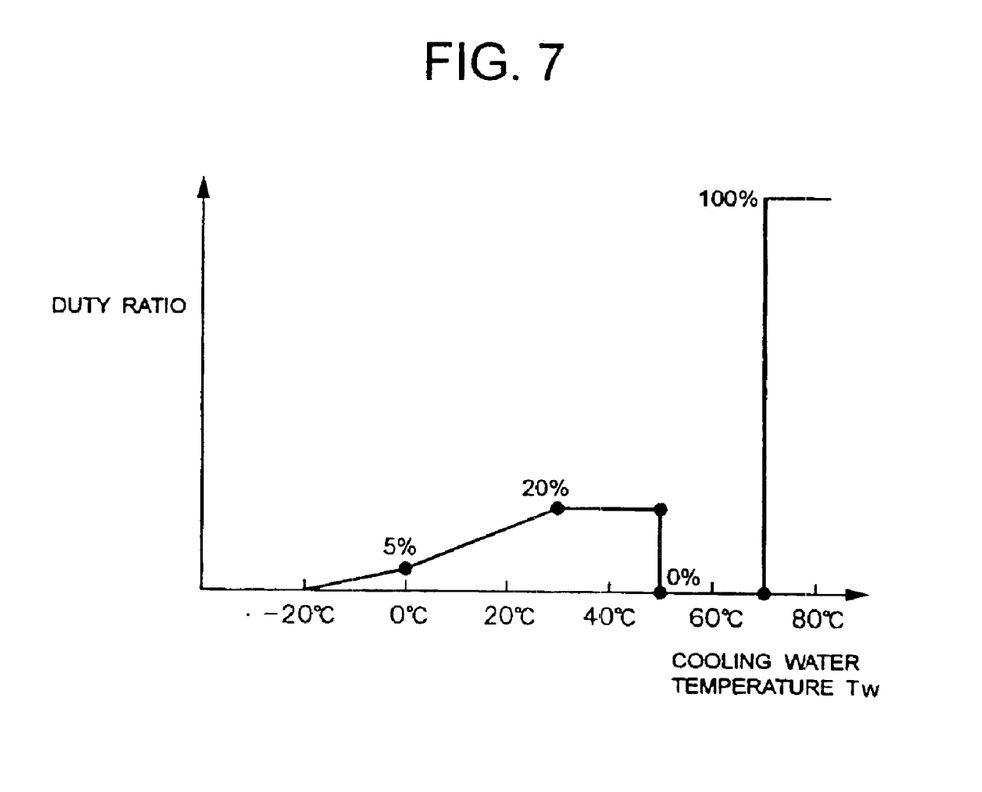
FIG. 7 illustrates relationship between a cooling water temperature and a duty ratio.

The table of the duty ratio-cooling water temperature Tw, as shown in FIG. 7, is stored in the memory 25 so that the CPU 22 can determine the duty ratio from the cooling water temperature Tw by referring to the table. After determining the duty ratio, the CPU 22 outputs the duty ratio data, which represents the duty ratio, to the duty pulse generating circuit 23 (Step S14). Subsequent to Step S14, the CPU 22 determines whether the warm-up of the engine 11 is complete (Step S15). Completion of the engine warm-up is determined by, for example, the cooling water temperature Tw. If the cooling water temperature Tw is higher than a prescribed value, it is determined that the warming up is complete. When the CPU 22 determines that the warming up is still proceeding, then the program returns to Step S12 to repeat Steps S12 to S15. When the CPU 22 determines that the warming up is finished, then the duty ratio determination process is finished.

By executing the duty ratio determination process shown in FIG. 6, the speed of the temperature increase of the PTC heater 18 (i.e., the closing speed of the thermo-sensitive valve 17) is controlled (tracking control) on the basis of the changing value of the cooling water temperature Tw during the warming up of the engine. Since the relationship shown in FIG. 7 exists between the cooling water temperature Tw and the duty ratio, the duty ratio gradually increases from 0% to about 20% when the cooling water temperature T2 is low (below about 30 degrees C.). This is a typical situation after the start up of the engine. The temperature of the PTC heater 18 also increases gradually after the start up of the engine. This gradual temperature increase is preferred in order to avoid a thermal shock which would be caused when the PTC heater temperature increased steeply. When the cooling water temperature Tw reaches about 70 degrees C., the duty ratio is set to 100%, and the temperature of the PTC heater 18 reaches the maximum value. In this manner, the temperature increase of the PTC heater 18 is controlled, so that the life of the PTC heater 18 is extended.

In the above description, the duty ratio is determined by the cooling water temperature Tw at Step S3 and Step S13. It should be noted, however, that other engine operation parameters such as the engine head temperature, spark plug temperature, intake air temperature, exhaust gas temperature and engine revolution speed may also be taken into account to determine the duty ratio.

Also, the duty ratio may be changed in accordance with an elapse time from the start of the engine 11.

In the illustrated embodiments, the duty ratio is determined by the engine operation parameter(s) sensed at the time of the engine start. However, the duty ratio may be arbitrarily determined such that the thermo-sensitive valve 17 may have a desired opening/closing movement characteristic.

Although the duty pulse generating circuit 23 is separate from the CPU 22 in the above described embodiments, the CPU 22 may be designed to perform the function of the duty pulse generating circuit 23 and the separate duty pulse generating circuit 23 may be dispensed with.

Figure 8:
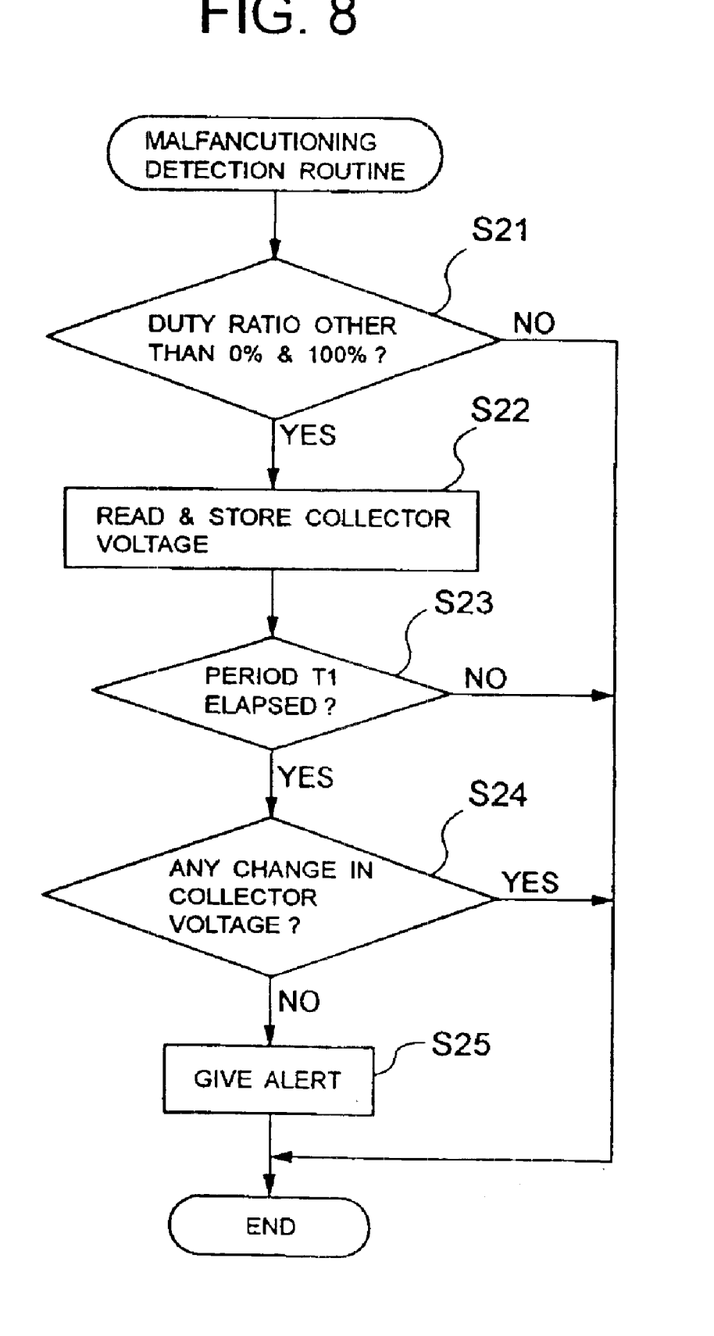
FIG. 8 illustrates a flowchart of a malfunctioning detection routine.

The CPU 22 may also perform a process of detecting malfunctioning by interrupt control, in addition to the duty ratio determination process. The malfunctioning detection process is performed at a period shorter than the period T1.

Referring to FIG. 8, the malfunctioning detection process will be described. The CPU 22 first determines whether the determined duty ratio is other than 0% and 100% (Step S21). In other words, the duty ratio determined at Step S3 or S13 is between 0% and 100%. If the duty ratio is greater than 0% and less than 100%, it means that the drive transistor 24 is repeatedly turning on and off. When the duty ratio is between 0% and 100%, then the CPU 22 reads the collector voltage of the drive transistor 24 via the input interface circuit 21 and stores the collector voltage (Step S22). Subsequently, the CPU 22 determines whether the period T1 has elapsed (Step S23). If the answer is no, the CPU 22 stops the malfunctioning detection process. On the other hand, if the answer is yes (i.e., the period T1 has elapsed), the CPU 22 determines whether the collector voltage of the drive transistor 24 has changed in the period T1 (Step S24). When the collector voltage has changed (e.g., the change from the power source voltage VB to the ground voltage, or the change from the ground voltage to the power source voltage VB), it means that the drive transistor 24 is turned on and off. This in turn means that the PTC heater 18 functions properly. If the proper functioning of the PTC heater 18 is confirmed, the CPU 22 deletes the data of the collector voltage stored in the memory 25, and is brought into a stand-by condition for the next malfunctioning detection process. On the other hand, if there is no collector voltage variation (Step S24), the CPU 22 determines that a malfunction has occurred. Possibly, the turning on and off of the drive transistor 24 does not take place properly, and/or electricity wiring for the PCT heater 18 and/or the drive transistor 24 are disconnected. If the collector voltage variation is not detected, a lamp (not shown) is lit to inform a user of the malfunctioning (Step S25).

In this manner, the CPU 22 determines whether the collector voltage of the drive transistor 24 changes with the duty ratio during the controlling of the drive current applied to the PTC heater 18 based on the duty ratio, so that the CPU 22 can detect the occurrence of the malfunctioning of the PTC heater 18.

It should be noted that the CPU 22 may determine that a malfunction has occurred when no collector voltage change is detected for some consecutive periods T1.

It should also be noted that the PTC heater may be replaced by any suitable heater or heat radiating element, such as a wire heater.

As understood from the above, the duty ratio is adjusted appropriately depending upon various conditions, and the opening/closing movement characteristic of the thermo-sensitive valve can be easily adjusted appropriately during the start-up period of the engine.

This application is based on a Japanese patent application No. 2002-221020, and the entire disclosure thereof is incorporated herein by reference.

What is claimed is:

1. A system for controlling a flow of intake air in a secondary intake air passage during a start-up period of an internal combustion engine, a main intake air passage extending to an intake port of the internal combustion engine, a throttle valve located in the main intake air passage, and the secondary intake air passage connecting to the main intake air passage at a position downstream of the throttle valve, the system comprising:
   a heat radiating element for radiating heat in response to a drive current supplied to the heat radiating element;
   a thermo-sensitive valve provided in the secondary intake air passage, an opening degree of the thermo-sensitive valve being changed as the thermo-sensitive valve is heated by the heat radiating element;
   parameter detection means for detecting a plurality of engine operation parameters of the internal combustion engine;
   determination means for determining a duty ratio that controls the drive current in accordance with the plurality of engine operation parameters detected by the parameter detection means; and
   drive means for supplying the drive current to the heat radiating element by applying a voltage pulse having a pulse width determined by the duty ratio at a predetermined period.

2. The system according to claim 1, wherein the determination means includes:
   first detection means for detecting a start up of the internal combustion engine;
   means for determining the duty ratio in accordance with the plurality of engine operation parameters when the first detection means detects the start up of the internal combustion engine.

3. The system according to claim 1, wherein the determination means includes:
   first detection means for detecting a start up of the internal combustion engine;
   third detection means for detecting completion of warm-up of the internal combustion engine; and
   means for repeatedly determining the duty ratio in accordance with the plurality of engine operation parameters after the first detection means detects the start up of the internal combustion engine until the third detection means detects the completion of the warm-up of the engine.

4. The system according to claim 2, wherein the plurality of engine operation parameters include at least two of a cooling water temperature, an engine head temperature, a spark plug temperature, an intake air temperature and an exhaust gas temperature.

5. The system according to claim 3, wherein the plurality of engine operation parameters include at least two of a cooling water temperature, an engine head temperature, a spark plug temperature, an intake air temperature and an exhaust gas temperature.

6. The system according to claim 1, wherein the heat radiating element includes at least one of a PTC heater and a wire heater.

7. The system according to claim 1, wherein the drive means includes:
   a switching element connected in series to the heat radiating element, thereby forming a DC circuit of the switching element and the heat radiating element;
   a power source for supplying a predetermined DC voltage across ends of the DC circuit; and
   means for generating a duty pulse having a pulse width determined by the determined duty ratio to turn on the switching element with the duty pulse, wherein the voltage pulse having the same value as the predetermined DC voltage is applied to the heat radiating element upon turning on of the switching element.

8. The system according to claim 7 further comprising voltage monitor means for detecting a change of a voltage at a convection between the heat radiating element and the switching element, and alarming means for determining an operating condition of the drive means based on a detection result of the voltage monitor means.

9. The system according to claim 8, wherein the alarming means determines that the drive means is malfunctioning if the voltage monitor means detects no voltage change.

10. A system for controlling a flow of intake air in a secondary intake air passage during a start-up period of an infernal combustion engine, a main intake air passage extending to an intake port of the engine, a throttle valve located in the main intake air passage, and the secondary intake air passage connecting to the main intake air passage at a position downstream of the throttle valve, the system comprising:
    a heater for radiating heat in response to a drive current supplied to the heater;
    a first valve provided in the secondary intake air passage, a valve opening degree of the first valve being changed as the first valve is heated by the heater;
    parameter detection unit for detecting a plurality of engine operation parameters of the internal combustion engine;
    a first controller for determining a duty ratio that controls the drive current in accordance with the plurality of engine operation parameters detected by the parameter detection unit; and
    a drive unit for supplying the drive current to the heater by applying a voltage pulse having a pulse width determined by the duty ratio at a predetermined period.

11. The system according to claim 10, wherein the first controller includes a unit for determining the duty ratio in accordance with the plurality of engine operation parameters after a start up of the internal combustion engine.

12. The system according to claim 10, wherein the first controller includes a unit for repeatedly determining the duty ratio in accordance with the plurality of engine operation parameters after a start up of the engine until completion of warm-up of the internal combustion engine.

13. The system according to claim 11, wherein the plurality of engine operation parameters include at least two of a cooling water temperature, an engine head temperature, a spark plug temperature, an intake air temperature and an exhaust gas temperature.

14. The system according to claim 12, wherein the plurality of engine operation parameters include at least two of a cooling water temperature, an engine head temperature, a spark plug temperature, an intake air temperature and an exhaust gas temperature.

15. The system according to claim 10, wherein the heater includes one of a PTC heater and a wire heater.

16. The system according to claim 10, wherein the drive unit includes:
   a switching element connected in series to the heater, thereby forming a DC circuit of the switching element and the heater;
   a power source for supplying a predetermined DC voltage across ends of the DC circuit; and
   a duty pulse generator for generating a duty pulse having a pulse width determined by the determined duty ratio to turn on the switching element with the duty pulse, wherein the voltage pulse having the same value as the predetermined DC voltage is applied to the heater upon turning on of the switching element.

17. The system according to claim 16, further comprising a voltage monitor for detecting a change of a voltage at a connection between the heater and the switching element, and an alarm unit for determining an operating condition of the drive unit based on a detection result of the voltage monitor.

18. The system according to claim 17, wherein the alarm unit determines that the drive unit is malfunctioning when the voltage monitor detects no voltage change.

* * * * *